R. M. WITHYCOMBE.
TOOTHBRUSH.
APPLICATION FILED MAR. 15, 1920.
1,382,587. Patented June 21, 1921.
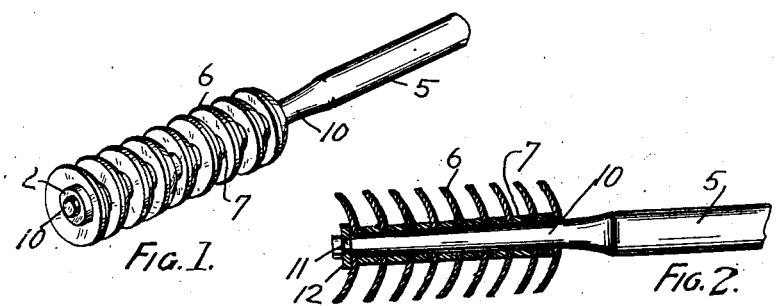
Inventor
Robert M. Withycombe
by
Attorney

UNITED STATES PATENT OFFICE.

ROBERT MORSE WITHYCOMBE, OF PENSHURST, NEAR SYDNEY, NEW SOUTH WALES, AUSTRALIA.

TOOTHBRUSH.

1,382,587.  Specification of Letters Patent.  Patented June 21, 1921.

Application filed March 15, 1920. Serial No. 365,835.

*To all whom it may concern:*

Be it known that I, ROBERT MORSE WITHYCOMBE, a subject of the King of Great Britain, residing at Penshurst, near Sydney, in the State of New South Wales, Commonwealth of Australia, have invented certain new and useful Improvements in Toothbrushes, of which the following is a specification.

This invention has reference to improvements in toothbrushes and has for its object the production of a hygienic article which may be used to clean the teeth effectively and massage the gums without risk of injury to the latter and which avoids the danger frequently caused by broken bristles thereby overcoming the reluctance which persons with tender gums have to the use of the ordinary brushes.

The invention consists in securing on a suitable handle or stem a plurality of thin flexible disks preferably of elastic rubber which may be spaced apart by distance pieces. Preferably, on to a suitable handle or stem I slide a series of such disks provided with a central aperture smaller than the cross sectional area of the stem, which causes a distortion of the disks, owing to their close frictional contact with the stem, so that they are concave on one side and convex on the other. This change of shape when in position on the stem imparts some rigidity to the disks and when used insures better frictional contact with the surfaces of the teeth or gums and at the same time more readily retains the tooth paste or other cleansing agent.

In lieu of disks having continuous peripheral surfaces I may utilize pieces having interrupted or serrated surfaces or the latter and the disks may be used in combination. The terminal disk may be held in place by means of a flexible ring, such as rubber, engaging an annular groove formed adjacent the end of the stem. The disks or pieces having interrupted peripheral surfaces may be perforated to assist in retaining the dentifrice. The distance pieces are preferably of flexible rubber and may be small rubber disks provided with a central aperture smaller than the stem.

Referring to the drawings herewith,

Figure 1 is a perspective view of the preferred form of my invention.

Fig. 2 is a central longitudinal section thereof.

In the illustrated form of my invention the handle 5 is provided with a shank 10 and has near one end a recess 11 in which an elastic cap or ring 12 is adapted to engage after the elastic disks 6 and spacers 7 have been placed on the tapered portion 10 by expanding the apertures therein and sliding them over the tapered shank. The apertures of the disks and intervening elastic spacers are normally smaller than the corresponding cross sectional area of the tapered shank. These disks are therefore in close frictional contact with the tapered shank and by reason thereof and their resiliency they assume a concave or meniscus position on one side as shown in Fig. 2. This form imparts some rigidity to the disks although permitting flexible movements with the outer portions thereof which come in frictional contact with the teeth or gums.

Having thus described my invention what I claim as new and desire to protect by Letters Patent is:—

1. A device for cleaning the teeth and massaging the gums comprising a plurality of elastic disks having apertures formed therein, a shank of larger dimension than said apertures for passing through the latter whereby said disks when in assembled position are warped to a concaved formation on one side and means engaging the inner portions of said disks for preventing the longitudinal displacement thereof and permitting flexible movement of the teeth and gum engaging portions of the disks.

2. A device of the character described, comprising a plurality of apertured pieces of elastic and flexible material, a handle having a shank of a dimension larger than the normal diameter of the apertures passing through said apertures, and causing said pieces to assume a concave shape, and means maintaining said pieces in spaced relation.

3. A device of the class described comprising a handle having a tapered shank, a plurality of pieces of elastic and flexible material mounted upon and frictionally engaging the shank, and spacers of elastic material interposed between said pieces, said disks when in assembled position, being concave on one side.

4. A device of the class described comprising a handle having a shank, said shank having a recess formed therein near one end, disks of elastic material having central apertures normally of smaller cross section than said shank and adapted to be expanded whereby said disks may be frictionally mounted on the shank, elastic spacers of small dimension frictionally engaging said shank and interposed between said disks, and an elastic ring engaging said recess adapted in connection with said spacers to prevent longitudinal displacement of the disks.

In testimony whereof I have hereunto set my hand.

ROBERT MORSE WITHYCOMBE.